Figure 1:
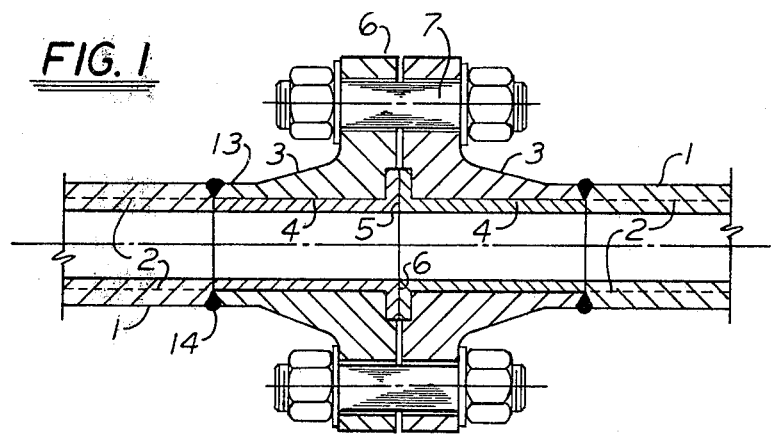

United States Patent [19]

Goetzinger

[11] 4,336,958
[45] Jun. 29, 1982

[54] PIPE FLANGE

[76] Inventor: John Goetzinger, 2956 W. 17th St., Erie, Pa. 16506

[21] Appl. No.: 65,342

[22] Filed: Aug. 9, 1979

Related U.S. Application Data

[63] Continuation-in-part of Ser. No. 859,297, Dec. 12, 1977, abandoned.

[51] Int. Cl.³ .......................... F16L 9/14; F16L 23/00
[52] U.S. Cl. ...................................... 285/55; 285/286; 285/329; 285/363; 285/416
[58] Field of Search ................. 285/55, 286, 416, 329, 285/422, 363, 173; 228/263 D; 219/121 EC, 121 ED

[56] References Cited

U.S. PATENT DOCUMENTS

| | | | |
|---|---|---|---|
| 171,440 | 12/1875 | Smith | 285/55 |
| 1,276,394 | 8/1918 | Monrath | 285/55 |
| 2,062,305 | 12/1936 | Gillette | 285/328 X |
| 2,070,291 | 2/1937 | McHugh | 285/55 |
| 2,157,357 | 5/1939 | Straty | 285/286 X |
| 2,216,033 | 9/1940 | Hopkins | 285/55 X |
| 2,308,307 | 1/1943 | Robinson | 285/55 X |
| 2,356,047 | 8/1944 | Geisinger et al. | 285/55 X |
| 3,100,656 | 8/1963 | MacArthur | 285/55 |
| 3,131,642 | 5/1964 | Geer et al. | 285/55 X |
| 3,307,860 | 3/1967 | Blount et al. | 285/55 |
| 3,454,740 | 7/1969 | Foulquier et al. | 219/121 EC |
| 3,476,586 | 11/1969 | Valtcher et al. | 219/121 ED X |
| 3,909,049 | 9/1975 | Blatnica | 285/329 |
| 4,026,583 | 5/1977 | Gottlieb | 285/55 |

FOREIGN PATENT DOCUMENTS

| | | | |
|---|---|---|---|
| 615036 | 1/1961 | Italy | 285/405 |
| 415201 | 12/1966 | Switzerland | 285/416 |
| 403932 | 8/1932 | United Kingdom | 285/55 |
| 838798 | 6/1960 | United Kingdom | 285/422 |
| 904975 | 9/1962 | United Kingdom | 285/55 |

Primary Examiner—Thomas F. Callaghan
Attorney, Agent, or Firm—Ralph Hammar

[57] ABSTRACT

A pipe flange coupling having a carbon steel body and flange with a bore extending through the body and flange and a bolt circle in the flange, a lining throughout the entire length and circumference of the bore, and a sealing surface on the flange radially inward of the bolt circle and radially outward of the bore, the sealing surface and lining being of corrosion resistant metal fusion welded to each other and to the flange and bore and providing a structurally unitary body which meets the pressure code and also protects the carbon steel from corrosion.

4 Claims, 7 Drawing Figures

PIPE FLANGE

This is a continuation in part of application Ser. No. 859,297 filed Dec. 12, 1977, and now abandoned.

In the chemical industry, stainless steel piping and valves are used which, although not subject to corrosion, are subject to erosion. When the erosion reaches a limit, the piping and valves must be replaced.

This invention is a pipe flange in which the body of the flange is of carbon steel and the sealing or gasket surfaces and bore are of corrosion resistant material such as stainless steel and the like. The corrosion resistant material has a thickness equal to or slightly in excess of the safe limit of erosion of the piping with which the flange is to be used. The corrosion resistant material is fusion bonded to the carbon steel body by electron beam welding which fuse the corrosion resistant coating to the carbon steel so the coating and the underlying body are structurally a unitary body which meets the Pressure Code and the coating protects the underlying body from corrosion.

In the accompanying drawing.

Figure 2:
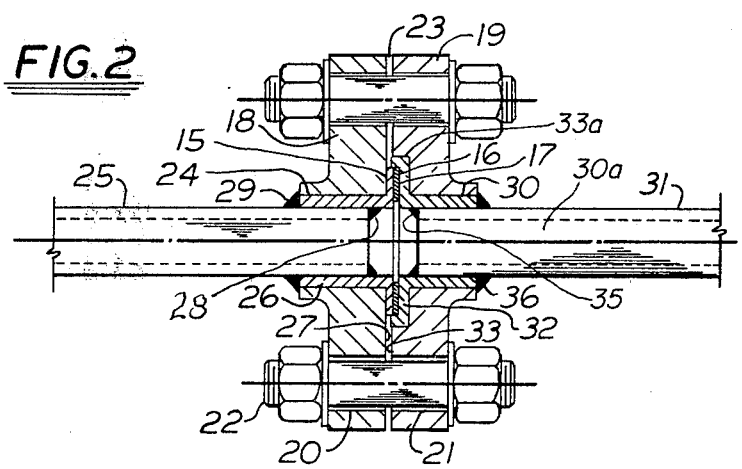
Figure 3:
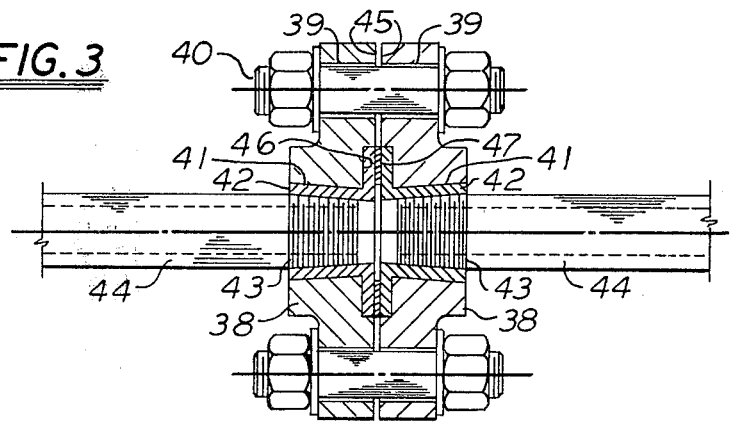
Figure 4:
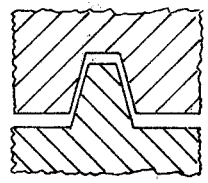
Figure 5:
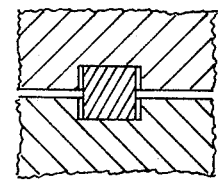
Figure 6:
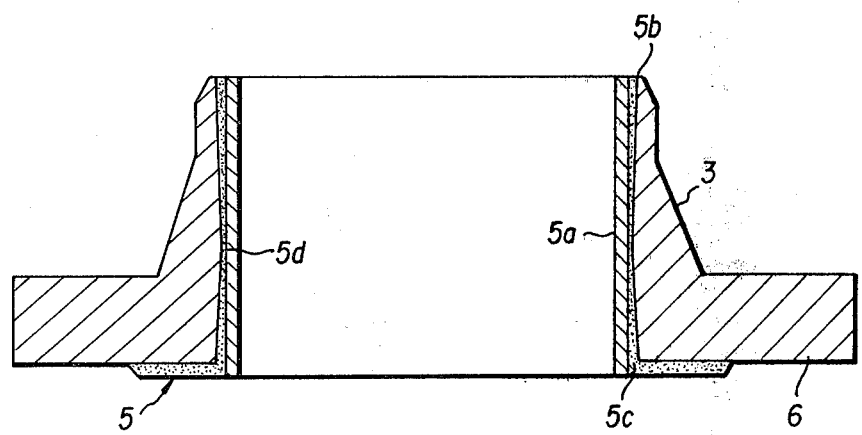
Figure 7:
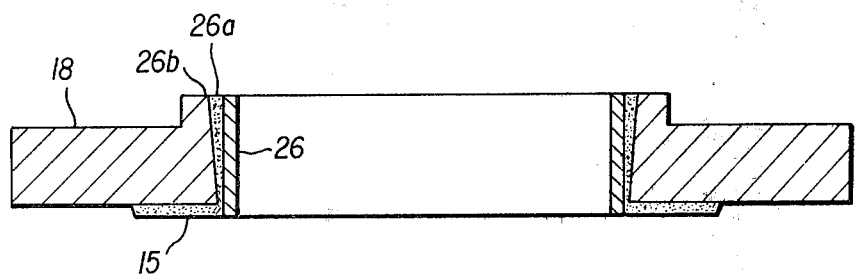

FIG. 1 is a section through weld neck flange couplings connected in a stainless steel pipe line, FIG. 2 is a section through slip on flanges connected in stainless steel pipe line, FIG. 3 is a section through flat face couplings connected to a stainless steel pipe line, FIG. 4 is a fragmentary section through a tongue and groove flange coupling, FIG. 5 is a fragmentary section through a ring joint flange coupling, and FIGS. 6 and 7 are diagrams of welds between a stainless steel tube and the bore of a carbon steel body.

FIG. 1 shows a line of stainless steel pipe 1 such as used in the chemical industry. While this pipe is not subject to corrosion, it is subject to erosion and the wall thickness of the pipe is periodically monitored. When the wall thickness is reduced by erosion to the extent indicated by dotted lines 2, the pipe line is replaced. The pipe line customarily has heretofore used flange couplings in which the body, flange, and sealing surfaces were a single piece of stainless steel.

In order to reduce the cost of the flange couplings, while retaining all of the corrosion resistant and structural properties of solid stainless steel, it is proposed that the flange couplings be made with a carbon steel body 3 having a bore 4 of the same diameter as the eroded bore 2 of the stainless steel pipe, that the bore of the coupling be a stainless steel tube 5a connected to the bore 4 by circumferentially and axially extending annular electron beam welds 5b, 5c, and the sealing surfaces 5 be provided by a continuous fusion welded coating of stainless steel. The welds 5b, 5c extend axially from opposite ends of the body 3 and are centered on the joint between the tube 5a and the bore 4. The welds are of greatest radial thickness at the ends and taper to a lesser thickness at the region 5d where the welds meet. The flanges 6 and bolt holes 7 which are entirely outside the liquid flowing through the pipe line 1 are made entirely of carbon steel to code standards. The outer surface of the stainless steel tube 5a is integrally united with the bore of the carbon steel body throughout its length and circumference. The welds 5b and 5c are fused carbon and stainless steel. The fusion welding process similarly unites the sealing surfaces 5 to the flange 6 and to the adjacent end of the tube 5a so the entire corrosion resistant lining is integrally united with the carbon steel body. The sealing surface 5 is completed by machining the outer surface 12 to the shape and degree of finish required by code standards. The result is a fitting which to the outside atmosphere is of carbon steel but to the atmosphere within the pipe line 1 is of stainless steel. The fitting also has the physical properties of a one piece stainless steel flange and meets the Pressure Code requirements. The particular flange fitting shown in FIG. 1 is known as a weld neck fitting. It has a neck 13 welded to the end of the pipe 1 by a weld 14. The weld 14 would be of stainless steel or of the same material as the pipe 1. The weld 14 is in the nature of an attachment weld which may be made in the field. It may, however, be made in a pipe fabricating shop which preassembles the flange couplings to the pipe.

FIG. 2 illustrates a slip on flange and another type of sealing structure. In this sealing structure a solid cylindrical projection 15 fits in an annular recess 16 and a gasket 17 is compressed between the projection and recess. The bodies 18 and 19 are of carbon steel and have bolt holes 20, 21 for bolts 22 which develop the sealing pressure. In the tightened position illustrated in FIG. 2 and bodies 18, 19 are spaced from each other as indicated at 23 so the entire pressure developed by the bolts 22 is transmitted as the sealing pressure exerted on the gasket 17. The bore 24 of the body 18 is of larger diameter than the stainless steel pipe 25 and has a stainless steel tube 26 telescoped into the bore and over the pipe 25. The end face 27 of the body 17 is flat and the sealing projection 15 is fused to the surface 27 and stands outwardly therefrom. As shown in FIG. 7, the stainless steel tube projects beyond the bore 24 a distance substantially equal to the thickness of the projection 15. The tube is fused to the bore 24 by an annular electron beam weld 26a consisting of a fused carbon and stainless steel and having an axial length equal to the length of the bore. The weld 26a starts at 26b and extends the entire length of the bore 24 along the junction between tube 26 and the bore 24. The electron beam fuses the carbon and stainless steel, the depth of fusion being greatest at the entrance end of the beam at 26b and decreasing toward the opposite end of the bore. In radial section the weld 26a is wedge shaped. The projection 15 is formed of stainless steel by a fusion welding process which unites the projection to the body 18 and to the tube 26. The body 18 is attached to the pipe 24 by an attachment weld 28 between the end of the pipe 25 and the inner surface of tube 26 and by another attachment weld 29 between the outer surface of the pipe 25 and the tube 26. If a leak should develop in either of the welds 28, 29 it would not be possible for the liquid content of the pipe 25 to come into contact with the carbon steel body 18 without first leaking to the atmosphere.

The differences between the body 19 and body 18 are brought about the difference in the shape of the sealing surfaces 15 and 17. The body 19 has a bore 30 with a stainless steel tube 30a having a sliding fit on the outer surface of stainless steel pipe 31. An annular stainless steel end face 32 is recessed into face 33 of the flange. The tube 30 is welded to the body 19 and to the end face 32 as shown in FIG. 7 and presents a positive barrier to corrosive liquids in the pipe 31. The flange is a unitary body which has the mechanical properties of a one piece flange and meets the Pressure Code requirements. The cladding 32 has a rim 33a which telescopes over the projection 15 and provides a pocket for the gasket 17. The body 19 is attached to the pipe 31 by an attachment weld 35 between the end of the pipe 31 and the cladding 30 and by an attachment weld 36 between the end of the cladding 30 and the outer surface of the pipe. These welds are preferably of stainless steel or of the same non corrosive material as the pipe.

In FIG. 3 is shown another flange coupling comprising two identical parts each having a body 38 of carbon steel provided with holes 39 for bolts 40. Each of the bodies has a tapered bore 41 lined with a corrosion resistant tube 42 internally threaded for cooperation with the threaded end 43 of the stainless steel pipe 44. The tube is secured to the body 38 by an annular electron beam weld as shown in FIG. 7. The thickness of the tube 42 is the same or slightly greater than the tolerable wear of the pipe 44. The opposing faces 45 of the bodies 38 have annular recesses 46 filled flush with fusion welded corrosion resistant material. The tube 42 and cladding 46 are integral with each other and both are fusion welded to the carbon steel body to provide an impenetrable barrier to the corrosive liquid carried by the pipe 44 and to provide the mechanical properties of a one piece body. When the bolts 40 are tightened the faces 45 are slightly spaced as shown so that the bolt pressure is transferred entirely to a gasket 47.

FIGS. 4 and 5 are examples of other sealing surfaces which may be used. There is no technical reason why any other sealing surface structure may not be used.

The electron beam weld is made in a vaccuum which insures cleanliness. For the flanges shown, electron beam welding is faster and lower in cost than other welding processes. The welds are a maximum of about 0.060" thick at the outer end so the quantity of metal fused is small. This reduces the energy required and minimizes distortion. At the end of the welding, no machining is required on the bore of the flange. The sealing surfaces require machining or polishing to code specifications.

By way of example, the electron beam weld 26a for a 4" diameter flange shown in FIG. 7 requires about fifteen seconds.

I claim:

1. A pipe flange coupling having a carbon steel body and flange, a bore extending through said body and flange, a bolt circle in said flange, a tube of corrosion resistant material telescoped in said bore and united thereto by an annular electron beam weld of fused metal extending axially along and embracing the junction between said tube and said bore throughout the length and circumference of said bore, the weld being wedge shaped in radial cross section with the greatest radial thickness at one end of the tube, said fused metal consisting of said carbon steel and said corrosion resistant material, and a sealing surface on said flange radially inward of said bolt circle and radially outward of said bore, said sealing surface being provided by a cladding of corrosion resistant material fusion welded to said flange and to fused metal and to said tube.

2. The flange of claim 1 in which said weld and said tube project beyond the flange end of said bore a distance equal to the thickness of said cladding.

3. The flange claim 1 in which the corrosion resistant material is stainless steel.

4. The pipe flange of claim 1 in which the tube and body are united by two annular election beam welds of fused metal, one extending from each end of the tube.

* * * * *